Feb. 14, 1961  R. H. TAVES  2,972,037
APPARATUS FOR MULLING BEVERAGES
Filed Dec. 7, 1959
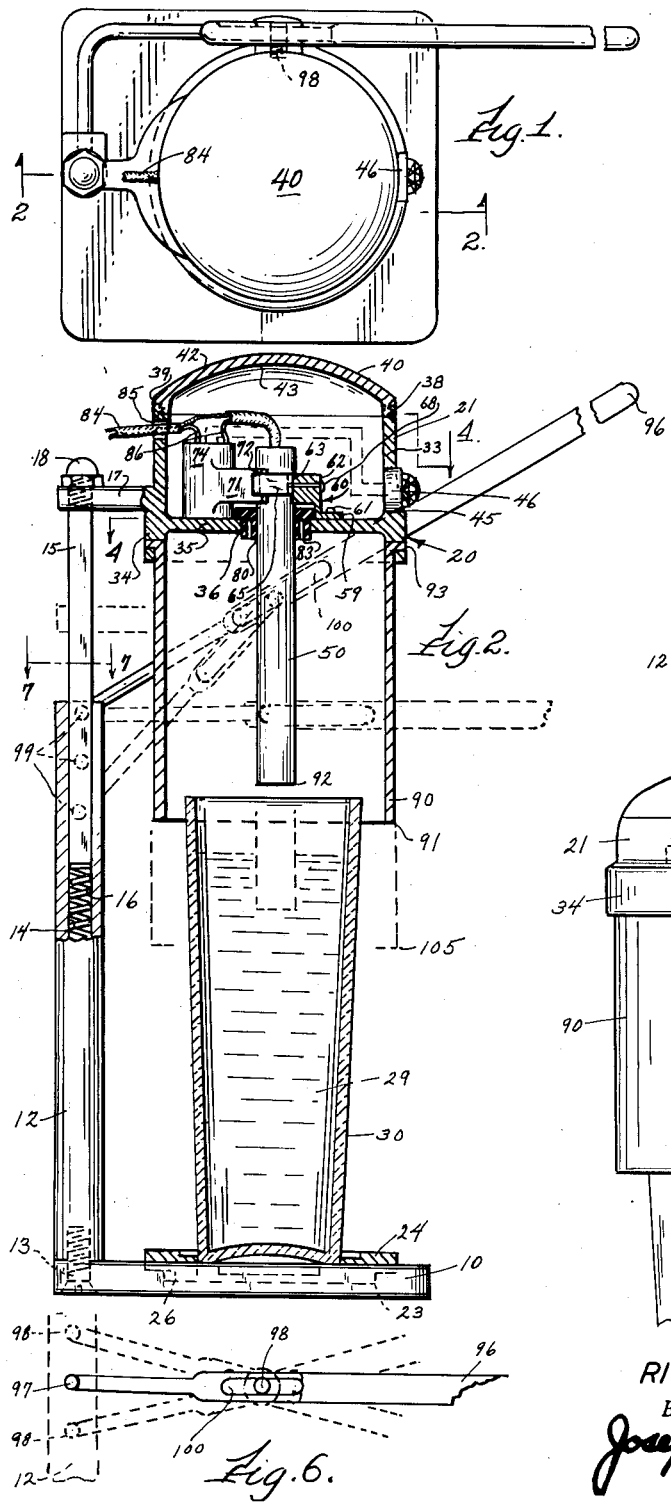
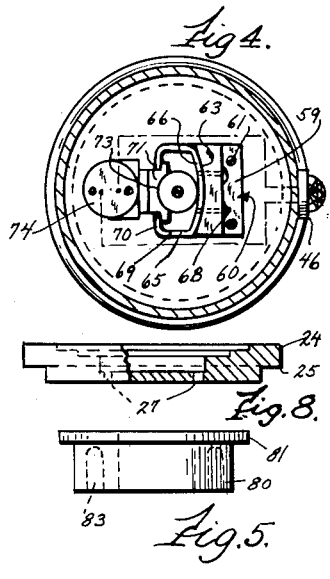
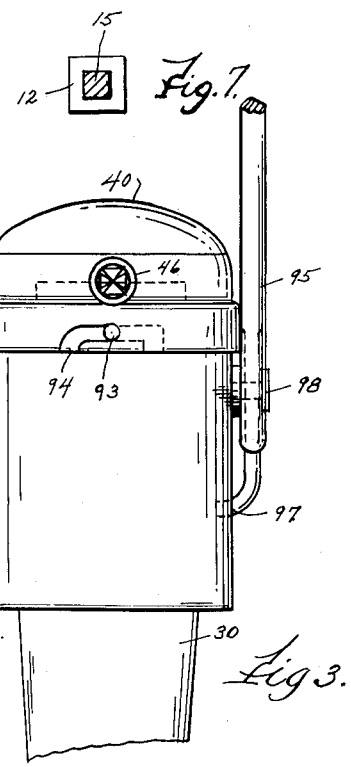
INVENTOR.
RICHARD H. TAVES.
BY
Joseph B. Lindecker
ATTORNEY.

United States Patent Office 2,972,037
Patented Feb. 14, 1961

2,972,037
APPARATUS FOR MULLING BEVERAGES
Richard H. Taves, 10611 W. Nevada, Melrose Park, Ill.
Filed Dec. 7, 1959, Ser. No. 857,858
9 Claims. (Cl. 219—41)

This invention relates generally to a device for mulling beverages in open-top containers, including alcoholic beverages such as beer, ale, etc., as well as non-alcoholic beverages, the preferred embodiment of the drawings illustrating my novel device as applied to warming a beverage such as beer.

An object of the present invention is the provision of such a device of new and improved construction.

Another object is to provide a simple electric device for mulling beer, or other beverages, in any open-top conventional container.

Another object is to provide means for automatically interrupting the energizing circuit when the heating element becomes too hot and also for maintaining the heating element at a uniform temperature.

Another object is to provide a quick, safe, sanitary and efficient immersion heater which is especially suitable for warming beer in glasses without danger of electrical shocks or burns to the user, and without causing the beer foam to run over the sides of the glass container.

A further object is to provide an electrical portable type device which has a depending heating poker which may be readily and easily immersed in a glass of beer, by the bartender, or the purchaser, thereby replacing the head on the beer, or tempering it to render the beer exceptionally palatable.

And still a further object of the invention is to provide an improved apparatus for mulling beverages embodying a three piece housing, having a main chamber to seal all the electrical control therein, and having a removable cover and a depending skirt portion, said skirt portion to form a guard means about the heating poker, the mulling accomplished by abruptly plunging into the beverage a heating poker which has been heated to red temperature, or a desirable temperature, by the application thereto of an electric current, and which apparatus will be convenient to operate, and compact in arrangement, and pleasing in appearance, and suitable to be disposed for use upon a bar or the like.

These and other objects, features, and advantages of the present invention will be readily apparent from the following description of illustrative embodiment thereof, taken in conjunction with the accompanying drawings, in which:

Figure 1 is a top plan view of the apparatus of the present invention showing an electric cord extending therefrom;

Figure 2 is a central vertical sectional view showing the apparatus of Figure 1 over a glass container, shown in section, suitable for retaining beverages to be mulled, various positions of the movable parts shown by dotted lines;

Figure 3 is a fragmentary side elevational vertical view of the apparatus shown by Figure 1 and over a container shown in part;

Figure 4 is a transverse sectional view taken substantially on line 4—4 of Fig. 2;

Figure 5 is a side elevational view of the heat sealing gasket shown by Fig. 2;

Figure 6 is a fragmentary side elevation of the operating arm of the apparatus, various selected positions thereof shown by dotted lines;

Figure 7 is a fragmentary transverse sectional view taken on line 7—7 of Figure 2; and Figure 8 is a side elevation of the drip tray, parts in section, as shown in use by Fig. 2.

Throughout the figures similar numerals refer to identical parts.

Referring to the drawings, particularly Figures 1, 2 and 4, I have shown a main base 10, and extending upwardly therefrom, a support 12 secured to the base 10 by the set-screw 13, the intermediate and upper portion of said support 12 being hollow and embodying an elongated cavity 14 of rectangular configuration and within which is telescoped the lower end of bar 15 of rectangular configuration, a coil compression type spring 16 assembled below said bar 15 and within said cavity 14; said spring 16 tending to keep said bar 15 in an elevated position. Upon the upper threaded end of the rectangular shaped steel bar 15 is secured to transverse bracket 17 by a round headed nut 18; said bracket forming an integral part of the intermediate portion 21 of housing 20. Said spring 16 therefore provides means to prevent the housing 20 from falling by gravity from the normal upper position illustrated by solid line by Figure 2, since said bar 15 supports the bracket 17 forming an integral part of the housing 20. The rectangular configuration of bar 15, sliding vertically within said cavity 14 of similar configuration effects the housing 20 to always be directly above the base 10. The upper surface of base 10 is provided with a stepped recess 23 therein, to receive a container tray 24. The tray 24 is formed of suitable material and consists of internal and external shoulders 25 produced by a progressive series of reductions in both the inside and outside diameters of the tray that results in giving it its generally downwardly tapered form. The external shoulders 25 of the tray 24 are of the same dimensions as the stepped shoulders 26 in recess 23 to removably and rigidly support the tray 24. The internal shoulders of the tray 24 are of desired configuration and size to receive beer or beverage containers 30 of various sizes. The trays 24 are provided with a plurality of vertical bores 27 extending through the base portion thereof to allow drainage of the beverage 29 which might overflow from the container 30.

The housing 20 is preferably made in three sections of cast metal, preferably an aluminum alloy which gives excellent castings and gives tensile strength and ductility as needed by a device of this nature for mulling beverages. The intermediate portion 21, of housing 20, consists of a cylindrical vertical wall 33 with a depending lower flange 34 and a transverse horizontal bottom plate 35 with a central bore 36. The upper end of the cylindrical wall 33 is provided with internal threads 38 to receive the external threaded peripheral portion 39 of the dome-shaped housing cover 40 which has a convex external surface 42 with concave interior surface 43. The front portion of said vertical wall 33 is provided with a horizontal bore 45 extending therethrough which is provided with lamp unit 46 in the circuit of the heating element 50 so that when the electric resistance heating element 50 is being energized, the lamp of the lamp unit 46 burns and shows from the exterior of the housing.

At 50 is illustrated a heating element of cylindrical form, the upper portion of said heating element 50, or poker, extending through said bore 36 of bottom plate 35. A Z-shaped support member 60 is secured to the upper surface of said bottom plate 35 by screws 61 extending through the flange base 59 thereof into said plate 35. Said support member 60 embodies an intermediate vertical wall 62 and an upper vertical transverse concave wall 63. A resilient spring clamp 65 composed of a yoke 66 which is secured to said concave wall 63 by screws 68 extending horizontally into said support member 60. Said spring clamp 65 also has side arms 69 which are formed with inturned ends 70 which are received in vertical side recessed portions 72 of an integral bracket 71 extending outwardly from a cylindrical shaped thermostat 74 removably assembled vertically on, or slightly above the bottom plate 35. As shown by Figure 4, said bracket 71 has a transverse portion with a concave vertical wall 73. The top end portion of heating element 50 is assembled between said concave vertical wall 73 of the thermostat bracket 71 and the inside wall of yoke 66 of spring clamp 65 and held in vertical alignment solely by said spring clamp 65. It is clearly seen that said Z-shaped support member is the sole support for said spring clamp 65, which supports and clamps both the thermostat 74 and heating element in position. A gasket 80 of cylindrical configuration with an outwardly extending top flange 81 is assembled within said bore 36 of bottom plate 35 through which the heating element extends; said gasket 80 is preferably made of asbestos material to separate the heating element 50 from bottom plate 35 and also to insulate the heating element from the plate 35. The lower surface of the top flange 81 of the gasket rests upon the top surface of said bottom plate 35; the cylindrical wall portion of said gasket 80 is provided with an annular air space 83 extending between its inner and outer walls effecting better insulation qualities. An electric cord or double conductor 84 is provided which extends through a horizontal bore 85 in the upper portion of said intermediate portion 21 of housing 20, and is electrically connected in series with the wires 86 extending from the thermostat 74 and to the heating element 50. Electrical conductors illustrated in dotted lines at 88 are provided, and electrically connected with and between said thermostat and said lamp unit 46, as explained above. The conductor 84 may extend to a switch, or double-prong connector, for attachment to an electric supply circuit, not shown.

The removably, detachable, depending cylindrical wall portion 90 of said housing 20 is provided to guard said heating element 50. The size of the wall portion 90 is such that it completely surrounds the vessel 30 which holds the beer 29 to be warmed. Also, the lower periphery 91 of the cylindrical wall 90 extends beyond or lower than the lower tip 92 of heating element 50, in order to prevent the heating element from coming in contact with the bottom of the container 30 when in its lowermost position. Two bosses or pins 93 are horizontally secured in the upper peripheral portion of wall 90, and extend outwardly therefrom at diametrically opposite sides thereof; said pins 93 are received in upwardly and laterally extending slots 94 arranged in the depending lower flange 34, as clearly shown by Fig. 3, for locking and removably securing said wall 90 to said flange 34.

An arm 95 is pivotally connected by a pivot pin 98 to the exterior of the cylindrical wall 90 of said housing 20. Said arm 95 has an upwardly extending handle 96 at one end and an in-turned pivot pin portion 97 at the opposite end thereof. In order to regulate the position of the housing above the beer containers 30 of various heights and control the movement of the heating element while in use, a plurality of pivot bearing bores 99 are formed in the upper side wall portion of said support 12 and spaced in vertical alignment. When a high container 30 is used, the pivot pin portion 97 of arm 95 is inserted in the uppermost bearing bore 99. The intermediate and lower arranged bores 99 are used for small containers. In order to permit rearrangement of the pivot pin portion 97, said arm 95 is provided with an elongated slot 100 intermediate its ends and through which pin 98 is movable. The ends of said slot 100 form stops for limiting the movement of the pin 98 therein which in turn limits the upward and downward travel of said entire housing 20. The governing slot 100 is clearly shown by dotted lines in Figure 2 and by solid lines in Figure 6.

The beverage to be mulled is contained in the container 30 which rests in tray 24 supported in the recess 23 in base 10, which centers the container under the heating element 50. The recessed portions of the tray conform to the shape of the base of the container and which, for use with the usual container which are beer glasses, are circular. In operation of the apparatus of my invention, the current is turned on and electric current flows from the source through the conductor 84 to the thermostat 74 and to the heating element 50 as controlled by the thermostat 74.

The poker, or heating element 50, having thus been heated, the operator by means of the handle 96, moves the housing 20 and the heating element, or poker 50, therewith downwardly, plunging the poker into the beverage 29 in the container 30 to any suitable depth, for example, to the position 105 shown dotted. The thermostat maintains the poker at a desired temperature to prevent cooling thereof at once by quenching. After the poker has been in the beverage, beer, for a sufficient length of time, the housing is raised again by the handle 96. The beer is now ready to be served.

The bar 15 will not be pulled out of the cavity 13 because the slot 100 in the arm 95 controls the upward movement of the arm and bar.

When the operation, or use of the apparatus, is finished for the period, or day's use, the current is disconnected from the apparatus. The poker becomes cool, the lower wall of the housing is rotated and removed from the intermediate portion of the housing, exposing the heating element, or poker. Due to the fact that the wiring and thermostat are sealed in the upper portion of the housing, the entire lower portion of the apparatus can be cleaned with water if so desired. This provides a sanitary apparatus which will pass the requirement met where food and beverages are prepared for serving. Whenever it is desired to replace the thermostat, or the poker, it is only necessary to remove the cover 40 of the housing 20, release the inturned ends of the spring clamp 65, and the thermostat and poker are free, since the spring clamp is the sole clamp, or securing means of both the thermostat and poker, since the yoke thereof is rigidly secured to the Z-shaped support member 60.

The apparatus is easily altered for use with containers of different heights by simply changing the location of the pivot end 87 of the arm 95 in the bores 99.

It will thus be seen from the foregoing description of my invention according to these illustrative embodiments, considered in conjunction with the accompanying drawings, that the present invention provides a new and improved beverage mulling apparatus having the desired advantages and characteristics, and accomplishing its intended objects, including those hereinbefore pointed out and others which are inherent in the invention as described.

It will be understood that modifications and variations may be effected without departing from the scope of the novel concepts of the present invention.

I claim as my invention:

1. A beverage mulling apparatus comprising, in combination, a main base formed to rest upon a bar or the like, a vertical substantially hollow support, a straight rigid bar slidably mounted within said hollow support, a compression spring within said hollow support and effecting upward movement of said bar arranged in contact with the upper end thereof, said housing having a supporting arm horizontally and integrally formed therewith, said supporting arm and said housing reciprocally supported on the upper end of said bar and said housing carrying a downwardly projecting electrical resistance heating element at sufficient elevation to permit a beverage container to be moved laterally to dispose it under and remove it from under the said heating element, said housing embodying a closed chamber with a dome shaped top portion removably secured to its bottom portion, said chamber enclosing a thermostat therein which is connected with said heating element, an operating arm having a pivot means at one end and a handle portion at the opposite end thereof, said pivot means at said one end pivotally connected with the side wall of said support, the intermediate portion of said operating arm slidably connected with said housing, said operating arm to reciprocate the housing to move the said heating element downwardly and upwardly by the user, said hollow support having a bottom wall, said compression spring resting upon said bottom wall and arranged between said bottom wall and the bottom end of said bar, the hollow cavity in said hollow support being of non-circular cross-section and said bar being of non-circular cross-section.

2. The beverage mulling apparatus according to claim 1, wherein said rigid bar is arranged to telescope within said hollow support in non-rotating manner and support said housing directly over said main base and any container positioned upon said base.

3. A beverage mulling apparatus comprising, in combination, a main base formed to rest upon a bar or the like, a straight vertical substantially hollow support with an inside bottom wall, a rigid bar slidably mounted within said hollow support, a compression spring arranged within said hollow support and upon said bottom wall and effecting upward movement of said rigid bar arranged in contact with the top end thereof, a housing, said housing having an outwardly projecting supporting arm integrally formed therewith, the outer end of said supporting arm being secured to the upper end portion of said rigid bar, said supporting arm and said housing reciprocally supported by said bar, said housing embodying a closed chamber with a top portion and a bottom portion, said top portion removably secured to said bottom portion, a thermostat arranged wihin said chamber, said housing carrying a downwardly projecting electrical resistance heating element at sufficient elevation to permit a beverage container to be moved laterally to dispose it under and remove it from the heating element, rigid means within said chamber, a single resilient means connected with said rigid means to removably support said thermostat and said heating element, an operating arm having a pivot means at one end and a handle portion at the opposite end thereof, siad pivot means at said one end pivotally connected with the side wall of said hollow support, the intermediate portion of said operating arm slidably connected with said housing, said operating arm to reciprocate said housing to move said heating element downwardly and upwardly when said handle portion is moved downwardly and upwardly by the user, said hollow support being non-circular in cross-section and said rigid bar being of non-circular cross-section and telescoping within said hollow support in non-rotating manner and supporting said housing directly over said base and any container positioned upon said base.

4. The combination according to claim 3, wherein said electrical heat resistance element is maintained at a constant temperature by said thermostat within said chamber in said housing when electrical energy is conducted to said element through said thermostat.

5. The combination according to claim 4, wherein said housing is formed of an upper closed section with a depending cylindrical skirt type guard wall, the upper end of said heating element projecting into said closed section and the lower end of said heating element projecting downwardly inside said guard wall, support means within said closed section removably supporting said thermostat and heating element therein as a unit.

6. The combination according to claim 5, wherein said heating element and thermostat support means has a body portion rigidly mounted with said housing and comprises a substantially U-shaped spring with in-turned ends horizontally secured therewith, said in-turned ends of said spring received in grooves in said thermostat and clamping the upper end of said heating element vertically between said thermostat and said body portion.

7. The combination according to claim 3, wherein said electrical resistance heating element extends vertically through a vertical bore in a horizontal wall of said housing and a cylindrical shaped gasket assembled within said vertical bore between said horizontal wall and said heating element.

8. A beverage mulling apparatus comprising, in combination, a main base formed to rest upon a bar or the like, a vertical substantially hollow support, the cavity within said support being substantially of rectangular cross-section, a rigid bar vertically and slidably mounted within said cavity of said support, said support rigidly secured to said main base, said rigid bar being substantially of rectangular cross-section and slightly smaller than said cavity, a housing reciprocally supported by said rigid bar, said housing having a main section with a bottom wall, cylindrical side wall, a removable top wall and a detachably depending skirt-type cylindrical guard wall, the portion of said housing above said bottom wall forming a substantially closed chamber, said bottom wall having a centrally located vertical bore, an electrical resistance heating element vertically mounted inside said guard wall with its upper end extending through said bore into said chamber, a heat sealing gasket assembled between said heating element and the bottom wall, a thermostat assembled within said chamber, a rigid support means secured to the upper surface of said bottom wall adjacent said bore, a laterally extending substantially U-shaped spring member with free ends attached to said rigid support means, the free ends of said spring mounted within recesses in said transformer and with the upper end of said heating element clamped between its yoke portion and said thermostat, thereby removably supporting said heating element in a vertical position, said heating element being supported at sufficient elevation to permit an open top beverage container to be moved laterally to dispose it under and remove it therefrom, an arm pivotally connected at one end with the hollow support and having a handle portion at the other end, said arm slidably connected with a wall of said housing, said cylindrical guard wall extending below the lower end of said heating element and surrounding said container when said housing is moved downwardly when said handle portion of said arm is moved downwardly by the user and plunging said heating element into the beverage within the open top container.

9. An immersion type heater for heating beverages in open-top containers comprising, in combination, an electrical heated poker, an electrical thermostat, a housing embodying a closed chamber and a depending cylindrical guard-wall, said chamber having a bottom wall with a central vertical bore therein, resilient spring means within said chamber and secured therewith, said thermostat removably supported by said spring means, the upper end of said poker extending into said chamber and supported by said spring means, said housing reciprocally supported by a suitable base and support means, a handle pivotally connected with said support means and slidably connected with said housing, and said guard wall of said housing being removable from said housing, said guard rail extending below the lower end of said poker and surrounding the open-top container when the poker is moved downwardly therein due to downward movement of said handle by the user, and an electrical source of energy conducted to said thermostat and to said poker whereby the poker is in use and is maintained at a desired constant temperature of the thermostat.

References Cited in the file of this patent
UNITED STATES PATENTS

| | | |
|---|---|---|
| 1,588,776 | Shoenberg et al. | June 15, 1926 |
| 1,680,743 | Leevers | Aug. 14, 1928 |
| 2,240,953 | Kaye | May 6, 1941 |
| 2,589,473 | Bellucci | Mar. 18, 1952 |